Feb. 16, 1932. J. F. BUHR 1,845,123
COLLET MEANS
Filed Feb. 4, 1929

INVENTOR
J. F. Buhr
BY
C. F. Heinkel
ATTORNEY

Patented Feb. 16, 1932

1,845,123

UNITED STATES PATENT OFFICE

JOSEPH F. BUHR, OF ANN ARBOR, MICHIGAN

COLLET MEANS

Application filed February 4, 1929. Serial No. 337,278.

My invention relates to collet structure wherein one member is insertable into another member.

Objects of my invention are a collet means economical of production, easy and efficient of operation, retaining the parts thereof in correct working relation with each other, reducing uneven wear on parts, and adjustability of relations between parts. Other objects will be pointed out in this specification, or will become apparent or obvious, or will suggest themselves upon an inspection of the specification or of the drawings or of both.

A desirable feature in collet means is to have a tool adjustable longitudinally in a collet means. In multiple drill heads for instance, it is often necessary that each of the drills should drill a hole to a definite depth when the drill head as a unit is moved a certain distance. For such purpose, when the drill is not adjustable longitudinally in relation to the socket, it is necessary to provide drills of definite lengths. The proper lengths of drills is not always available to so drill these holes to a definite depth with sockets which have no adjustment and it is too expensive to grind or otherwise reduce drills to required lengths so that they can be used in such heads.

My invention provides adjusting means in the socket so that each of the drills in a drill head mentioned above, or other tools in a similar head, or individual tools in which a certain face or part thereof can be adjusted longitudinally so that the same always has a definite relation to the tool operating part of a machine, or to a jig, or to other parts of the machine when the tool is moved a certain distance.

A desirable feature in collet means is to retain alignment and proper relations between the collet means and tools so that accurate work can be produced.

My invention provides as much wearing surface as possible on parts which are subject to wear and also provides adequate locking and retaining means to hold the parts together effectively to prevent displacement thereof.

A desirable feature in adjustable collet means is to prevent shifting of parts after adjustment is made and while the parts are finally tightened in adjusted position and to have some indicating means which shows or indicates at least to some extent about how much adjustment is being made.

My invention provides means to primarily retain parts in adjusted position while the adjustment is being locked and to indicate about how much adjustment is being made.

A desirable feature in collet means, particularly in adjustable collet means wherein additional parts are necessary, is economical production of the collets.

My invention provides resilient means between parts to eliminate the expensive machining and fitting operations which would be necessary without resilient means.

In order to convey a clear idea of my invention, I have selected one type of collet means and have embodied my invention therein and have shown the same in the accompanying drawings and will describe in detail this particular collet means so shown in the drawings. However, I am aware that my invention is applicable to collet means other than the one shown and described; therefore such showing and describing shall not constitute a limitation of my invention.

In the accompanying drawings mentioned:—

Similar reference characters refer to similar parts throughout the views.

Figure 1:
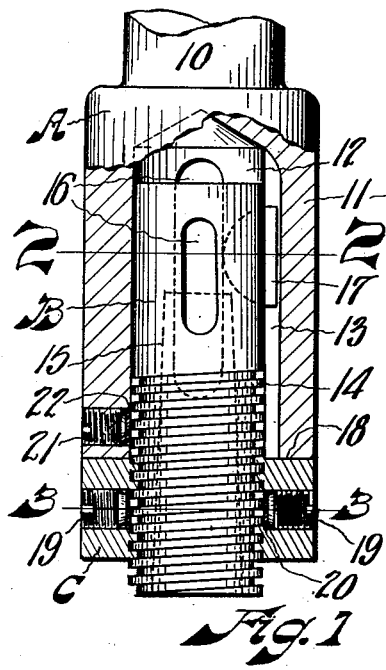
Fig. 1 is a side view of an adjustable collet means, embodying my invention, partly in longitudinal section to show interior relations of parts more clearly.

Essentially, the collet means shown in the drawing comprises the socket member A, the partly insertable member B, and the adjusting member C.

Figure 2:
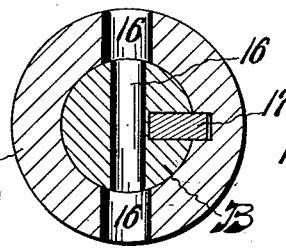
Fig. 2 is a transverse section taken in a plane indicated by the line 2—2 in Fig. 1 and shows more clearly the transverse relations between the socket member and the insertable member and the rotation preventing key.
Figure 3:
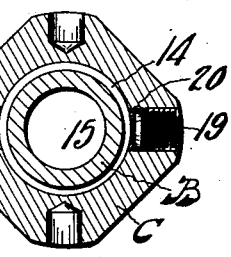
Fig. 3 is a transverse section taken in a plane indicated by the line 3—3 in Fig. 1 and shows more clearly the transverse relations between the adjusting member and the insertable member and the lock means for the adjustable member.
Figure 4:
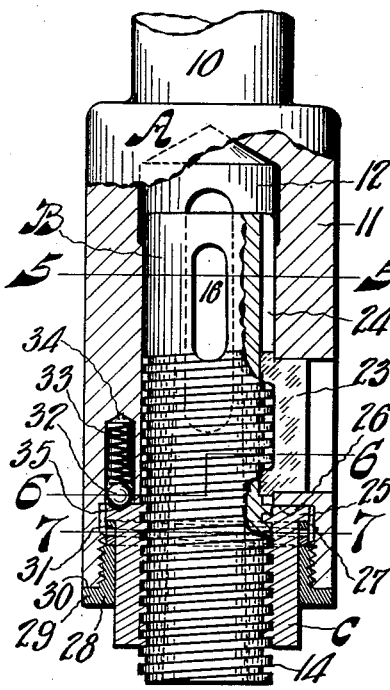
Fig. 4 is a side view of an adjustable collet means, similar in general type as the one shown in Fig. 1, embodying my invention, partly in longitudinal section to show interior relations of parts more clearly.
Figure 5:
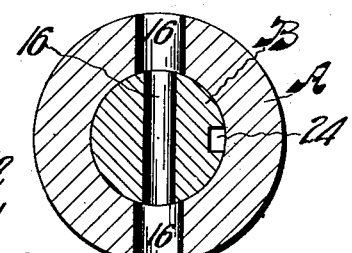
Fig. 5 is a transverse section taken in a plane indicated by the line 5—5 in Fig. 4 and shows more clearly the transverse relations between the socket member and the insertable member.

In Figs. 1, 2 and 3 the socket member A has the shank 10 for engagement with or connection to a rotatable or unrotatable spindle or shaft and the socket portion 11 with the socket 12 therein and the keyway 13 in the socket.

The insertable member B fits into the socket 12 and has the thread 14 on one end portion thereof. In this instance, the taper socket 15 for taper shank tools and the drift holes 16 are provided in the members A and B although the insertable part of the member B may be formed directly on a tool. In this instance, the Woodruff key 17 is mounted in the member B and engages the keyway 13 to prevent rotative movement between the members A and B.

The adjusting nut or member C is threaded onto the thread 14 of the member B and is abuttable on the end 18 of the member A and is lockable in position on the member B by means of the set screws 19 with the soft metal shoes 20 thereunder to prevent the set screws from marring the thread.

Upon rotation of the member C, the member B moves longitudinally inward or outward of the member A and thereby moves a tool with it and adjusts the same. After the tool is adjusted, the screws 19 are tightened to retain the adjustment of the member C on the member B and the screw 21 with the soft metal shoe 22 thereunder is tightened while the member C is abutting the end of the member A to hold the members together. For quick change of tools, the set screw 21 shown may be replaced by a screw with a handle thereon, or by another kind of clamping or holding means, or may be eliminated entirely when the tool is used horizontally or in such a manner that the same does not leave the socket without effort.

Since the member C moves the member B inwardly and outwardly of the member A by a threaded means between the same, some of the threads on the member B must necessarily extend into the socket 12; therefore only the tops of the threads bear on the wall of the socket near one end of the same while the unthreaded portion bears completely on the wall.

Usually, tools held in such sockets are crowded sidewise at or near their cutting end and thereby create a side pressure and side wear between the wall of the socket and the member B. This sidewise pressure has a tendency to mar the tops of the threads or to wear them down to some extent and thereby create more clearance between the wall of the socket and the inserted part of the member B than was originally provided or intended and thereby permits the tool increasingly more freedom to move sidewise with consequent inaccurate work and tendency to throw the spindle out of true running condition due to the ability of the member B to wiggle in the socket. This condition is mitigated if not entirely eliminated by applicant's discovery that a square thread or other flat top thread could be used and that the same eliminates the disadvantages of a V thread.

When V threads are used for the adjusting means, the tops of the threads wear down very quickly and also are marred very easily by sidewise pressure of tools as well as by the set screws and thereby not only creates looseness of the member B in the socket but also greatly impairs adjustment due to marred threads.

To provide as much bearing surface as possible between the wall of the socket and the member B and to prevent marring of the thread by the set screws, my invention uses square threads between the members A, B, and C.

In Figs. 4, 5, 6, and 7 the general form of the members A and B are similar to the members A and B in Figs. 1, 2, and 3.

In the present instance, the key 23 is mounted in the member A and extends into the socket 12 and the keyway 24 is provided in the member B.

The adjusting member C here has the flange 25 bearing against or abutting on the bottom 26 of the counterbore 27 in the member A.

The confining member 28 is threaded into the counterbore 27 and has the flange 29 permanently abutting on the end 30 of the member A.

The spring like resilient filler member 31 is interposed between the flange 25 and the inner end of the member 28.

Figure 6:
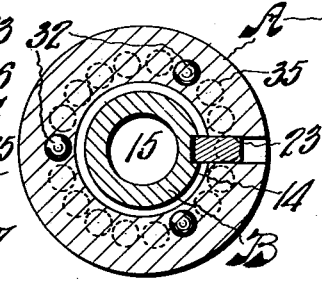
Fig. 6 is a transverse section taken in a plane indicated by the line 6—6 in Fig. 4 and shows more clearly the transverse relations between the socket member and the insertable member and the key means and the indexing means.
Figure 7:
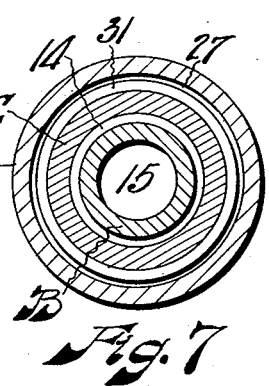
Fig. 7 is a transverse section taken in a plane indicated by the line 7—7 in Fig. 4 and shows more clearly the transverse relation between the socket member and the insertable member and the adjusting member and the resilient means of the locking mechanism for the adjusting member.

The intermediate member, the ball 32 in this instance, three being shown in Fig. 6, is mounted against the spring 33 in the socket 34 in the member A and thereby resiliently moves into and out of depressions, in this instance the countersinks 35 in the member C spaced in a circle of the same radius from the longitudinal axis of the collet as the center of the ball. More or less than three balls can be used when desired.

Longitudinal adjustment of the member B in the member A is attained by rotating the member C, by means of a wrench or other suitable means.

After the longitudinal adjustment is made, the member 28 remains at home so that the flange 29 thereof abuts the end 30 of the member A and thereby locks itself in position and at the same time retains the member 31 between the flange 25 on the member C and the inner end of the member 28 and thereby retains the member C against the bottom 26 of the counterbore and prevents movement of the member C.

This retaining means eliminates the possibility of injuring the thread on the member C and the introduction of the member 31 eliminates the necessity of close machining and fitting of the members.

While the member C is being rotated, the ball 32 moves into and out of the depressions 35 and thereby causes an operator to feel the different adjusting differences the member C has traveled and thereby controls the amount of adjustment and forming an index to determine the amount of adjustment attained between one or more of the index depressions as indicated by the ball entering the same. This ball and depression structure also assists to hold the member C in adjusted position to prevent the same from shifting from its indexed or adjusted position.

As previously mentioned, I am aware that my invention is applicable to collets other than the one shown and described. I am further aware that changes and modifications can be made in the structure as well as in the arrangement of the parts shown and described herein within the scope of the appended claims; therefore without limiting myself to the precise application of my invention nor to the precise structure and arrangement of parts as shown and described,

I claim:—

1. A collet means including a socket member, a member partly insertable into said socket member and longitudinally adjustable therein, an adjusting member to adjustably move said partly insertable member in said socket member, and means including a plurality of index depressions in one of said members and at least one element resiliently mounted in another one of said members in a position to successively engage and be raised out of said depressions upon a relative movement between said adjusting and socket members to indicate stages of adjustment of said insertable member.

2. A collet means including a socket member, a member partly insertable into said socket member and longitudinally adjustable therein, an adjusting member to move said partly insertable member in said socket member for longitudinal adjustment between said insertable member and said socket member, a retaining means for said adjusting member abutting on said socket member, and a filler member to retain the same in position and to retain said adjusting member against said socket member between said retaining means and said adjusting member.

3. A collet means including a socket member, a key means mounted in said socket member and extending into the socket therein, a member partly insertable into said socket member and longitudinally adjustable therein and having a keyway therein adapted to receive the extending portion of said key means, an adjusting member to move said partly insertable member in said socket member for longitudinal adjustment between said insertable and socket members and abutting on said socket member, a retaining means for said adjusting member abutting said socket member, and a resilient member between said lock member and said adjusting member to resiliently relate said adjustment member to said lock and socket members.

4. A collet means including a socket member, a key means mounted in said socket member and extending into the socket therein, a member partly insertable into said socket member and longitudinally adjustable therein and having a keyway therein adapted to receive the extending portion of said key means, an adjusting member to move said partly insertable member in said socket member and abutting the same, a retaining means for said adjusting member, and a resiliently mounted member and a plurality of corresponding index depressions between said adjusting and said socket members.

5. A collet means including a socket member, a key means mounted in said socket member and extending into the socket therein, a member partly insertable into said socket member and longitudinally adjustable therein and having a keyway therein adapted to receive the extending portion of said key means, an adjusting member to move said partly insertable member in said socket member and abutting the same, a retaining means for said adjusting member abutting said socket member, a resilient member between said retaining means and said adjusting member, and a resiliently mounted member and a plurality of corresponding depressions between said adjusting and said socket members.

6. A collet means including a socket member, a member partly insertable into said socket member and longitudinally adjustable therein, an adjusting member to move said partly insertable member longitudinally in said socket member, and a retaining means threaded into said socket member to hold said adjusting member in position longitudinally of the collet means.

7. A collet means including a socket member, a member partly insertable into said socket member and longitudinally adjustable therein, an adjusting member to move said partly insertable member longitudinally in said socket member and abutting the same, a retaining means threaded into said socket member and abutting the same and a resilient member between said retaining member and said adjusting member to resiliently relate said adjusting member to said lock and socket members.

8. A collet means including a socket member, a member partly insertable into said socket member and longitudinally adjustable therein, an adjusting member to move said partly insertable member longitudinally in said socket member, a retaining means for said adjusting member threaded into said socket member, and a resiliently mounted member and a plurality of corresponding depressions between said socket member and said adjusting member; said resiliently mounted member being adapted to move into and out of said depressions upon relative movement between said adjusting and socket members to feelingly indicate stages of adjustment of said adjusting member.

9. A collet means including a socket member, a member partly insertable into said socket member and longitudinally adjustable therein, an adjusting member to move said partly insertable member longitudinally in said socket member and abutting the same, a retaining member for said adjusting member threaded into said socket member and abutting the same, a resilient member between said retaining member and said adjusting member to resiliently relate said adjustment member to said lock and socket members, and at least one resiliently mounted member and a plurality of corresponding depressions between said socket member and said adjusting member; said resiliently mounted member being adapted to move into and out of said depressions upon relative movement between said adjusting and socket members to feelingly indicate stages of adjustment of said adjusting member.

10. A collet means including a socket member, a member partly insertable into said socket member and unrotatably and longitudinally movable therein, an external thread on said partly insertable member, the top of said thread being flat and close fitting on the inner wall of said socket member to provide bearing area between the top of the thread and said wall and improved alignment of said partly insertable member and said socket member, and an adjusting member engaging said thread to adjust said partly insertable member longitudinally in said socket member.

11. A collet means including a socket member, a member partly insertable into said socket member and unrotatable and longitudinally movable therein, an external square thread on said partly adjustable member, the top of said square thread fitting closely to the inner wall of said socket member to provide improved alignment of said partly insertable member and said socket member, and an adjusting member engaging said thread to adjust said partly insertable member longitudinally in said socket member.

12. A collet means including a socket member, a collet member partly insertable into said collet member and unrotatable and longitudinally movable and self aligning therein, the top of said thread being flat and close fitting on the inner wall of said socket member to provide bearing area between the top of said thread and said wall for improved alignment of said partly insertable member and said socket member and increased wearing surface between these members, an adjusting member engaging said thread to adjust said partly insertable member longitudinally in said socket member, and a locking means to retain said adjusting member in adjusted position.

In testimony of the foregoing, I affix my signature.

JOSEPH F. BUHR.